United States Patent

[11] 3,570,508

| [72] | Inventors | John A. Boggs;<br>Billy R. Boggs, Kress, Tex. |
|---|---|---|
| [21] | Appl. No. | 518,100 |
| [22] | Filed | Jan. 3, 1966 |
| [45] | Patented | Mar. 16, 1971 |
| [73] | Assignee | Boggs Farmers Supply, Inc.<br>Kress, Tex. |

[54] FERTILIZER INJECTORS
14 Claims, 4 Drawing Figs.

[52] U.S. Cl. ................................................ 137/2,
137/99, 137/559, 239/310, 259/7, 259/95
[51] Int. Cl. ................................................ B05b 7/26
[50] Field of Search ................................................ 239/310;
103/6, 45, 117 (M); 137/2, 8, 9, 12, 87, 98, 99,
546, 559, 108 (Cursory); 138/44 (Cursory);
285/337; 259/7, 95

[56] References Cited
UNITED STATES PATENTS

| 434,392 | 8/1890 | Hyatt | 137/99X |
| 830,046 | 9/1906 | Bole | 137/108 |
| 1,223,021 | 4/1917 | Allen | 137/99 |
| 1,671,789 | 5/1928 | Smith | 285/337X |
| 2,252,939 | 8/1941 | McCoy | 137/98X |
| 2,691,347 | 10/1954 | Zimmer | 103/117M |
| 2,903,008 | 9/1959 | Abbadessa | 137/99 |
| 2,904,809 | 9/1959 | Clayson | 138/44X |
| 2,920,640 | 1/1960 | Porter | 137/99 |
| 3,116,749 | 1/1964 | Waugh | 137/99 |
| FOREIGN PATENTS | | | |
| 760,408 | 10/1956 | Great Britain | 137/559 |

Primary Examiner—William F. O'Dea
Assistant Examiner—David J. Zobkiw
Attorney—Charles W. Coffee

ABSTRACT: Fertilizer is fed to irrigation water at a preset time rate by a pump powered by the flow of irrigation water.

Patented March 16, 1971 3,570,508

INVENTORS: JOHN ANDREW BOGGS
BILLY RAY BOGGS

BY  *C. M. McAfee*
Atty.

INVENTORS: JOHN ANDREW BOGGS
BILLY RAY BOGGS

FERTILIZER INJECTORS

This invention relates to applying fertilizer and more particularly to injecting the fertilizer into the water which is used to irrigate agricultural fields.

According to this system, the fertilizer is injected into irrigation water at a constant time rate of flow. Therefore, if a farmer irrigates his fields for a set period of time (e.g., 12 hours), he will have applied a fixed amount of fertilizer to a particular field.

An object of this invention is to apply fertilizer to agricultural fields.

Another object is to inject fertilizer into irrigation water.

Another object is to inject fertilizer into irrigation water with a mechanism which operates only when water is being applied to the fields and which automatically stops if the water flow should stop for any reason.

A further object is to provide a fertilizer injector that does not require external source of power.

Still further objects are to achieve the above with a device that is sturdy, compact, durable, simple, safe, versatile, reliable, yet inexpensive and easy to manufacture and operate.

Still further objects are to achieve the above with a method that is rapid, inexpensive, and does not require skilled people to install, adjust, and operate.

The specific nature of the invention, as well as other objects, uses, and advantages thereof, will clearly appear from the following description and from the accompanying drawing, the different views of which are not to the same scale, in which.

Figure 1:
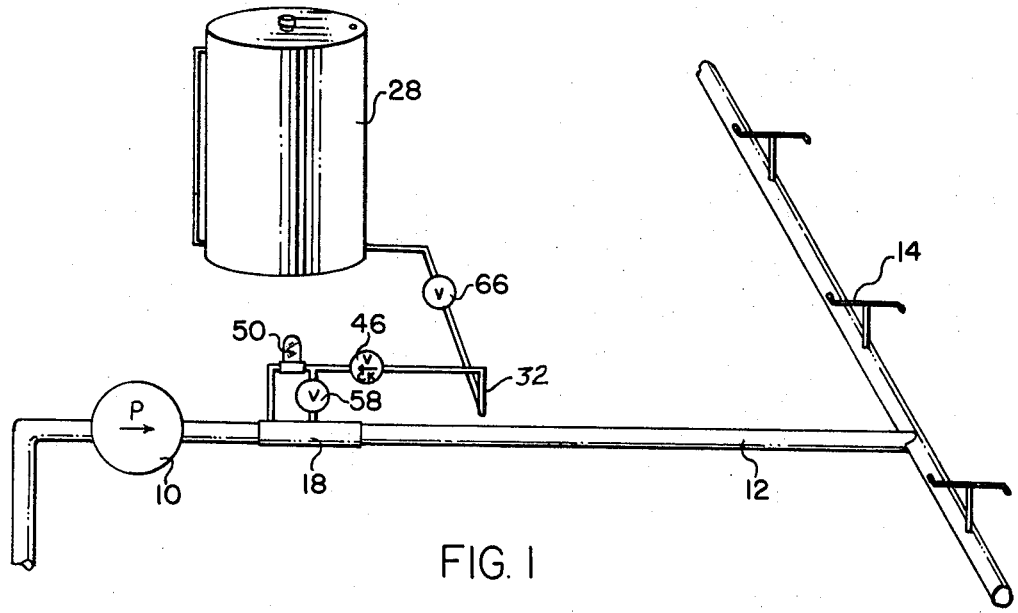
FIG. 1 is a schematic perspective of a typical system embodying this invention.

Although we speak of fertilizer, it will be apparent that our invention is equally applicable to other agricultural chemicals to be mixed with water, e.g., insecticides, fungicides, herbicides, as well as hormones, etc. By agriculture, we include parks, golf courses, lawns, etc., as well as farms.

Referring more particularly to the drawings, water is supplied from pump 10 which, for the system, may be considered a supply of water under pressure to water pipe 12. The water is applied to the field by sprinklers 14, all as is known.

Fertilizer is applied through pump 16 which is mounted within section 18 of the water pipe 12. The section 18 is telescoped at each end over the adjacent ends of the water pipe 12. Rubber gaskets 20 surround the pipe 18 adjacent the flanges 22 of the section 18. Heads or clamps 24 are pulled together by bolts 26 to clamp the gasket, forming a seal between section 18 and adjacent portions of the water pipe 12, all of which is well known and commercially available on the market and commonly known as "Dresser" couplings.

Supply tank 28, filled with fluid fertilizer 30, is fluidly connected to the intake of the pump 16 by fertilizer supply conduit 32. The pump is powered by a propeller 34 directly connected to the shaft of the pump 16. The propeller is downstream from the pump and more particularly downstream from the pump outlets 36 which are open within the section 18 so that the propeller will act as a stirrer to mix the fertilizer with the water. The pump is a commonly-known-type with a helical rotor 38 which rotates within a flexible stator 40 to pump the fluid from the intake to the outlet. Such pumps are well known, commonly on the market, and well suited for this purpose. They have at least one extremely desirable characteristic in that, if they are not rotating, they form a seal so that, should the water flow cease through a malfunction of the pump 10, the fertilizer pump 16 also ceases to rotate due to lack of driving energy upon the propeller 34 and a seal is formed, preventing flow of fertilizer into the section 18 of the pipe 12.

The pump 16 is supported within the section 18 entirely by inlet nipple 42 which is threaded into the housing of the pump and outlet nipple 44 which is threaded into the outlet of the pump. The inlet and outlet nipples are welded into and through the walls of section 18.

Figure 4:
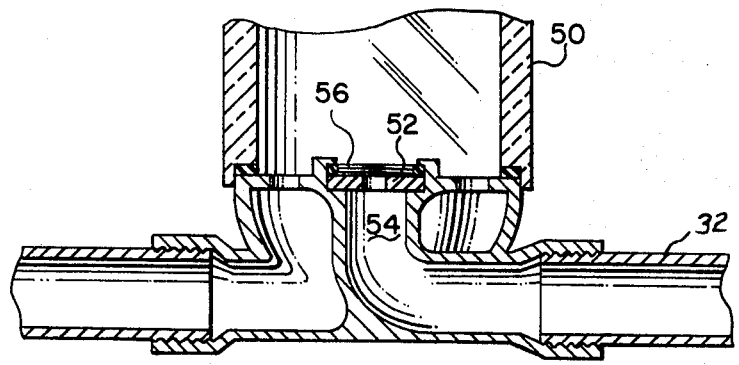
FIG. 4 is a detailed sectional view of the orifice.
Figure 2:
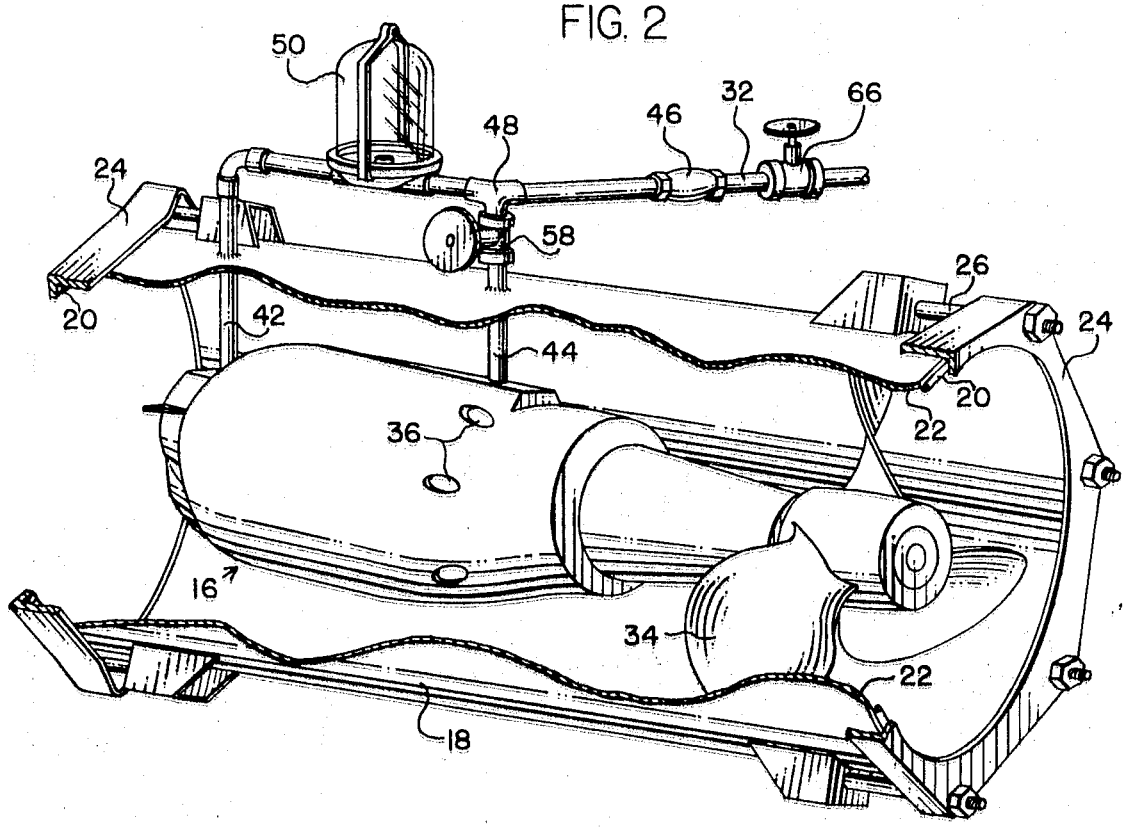
FIG. 2 is a perspective of the fertilizer pump with the section of pipe wherein it is located broken away for clarity.
Figure 3:
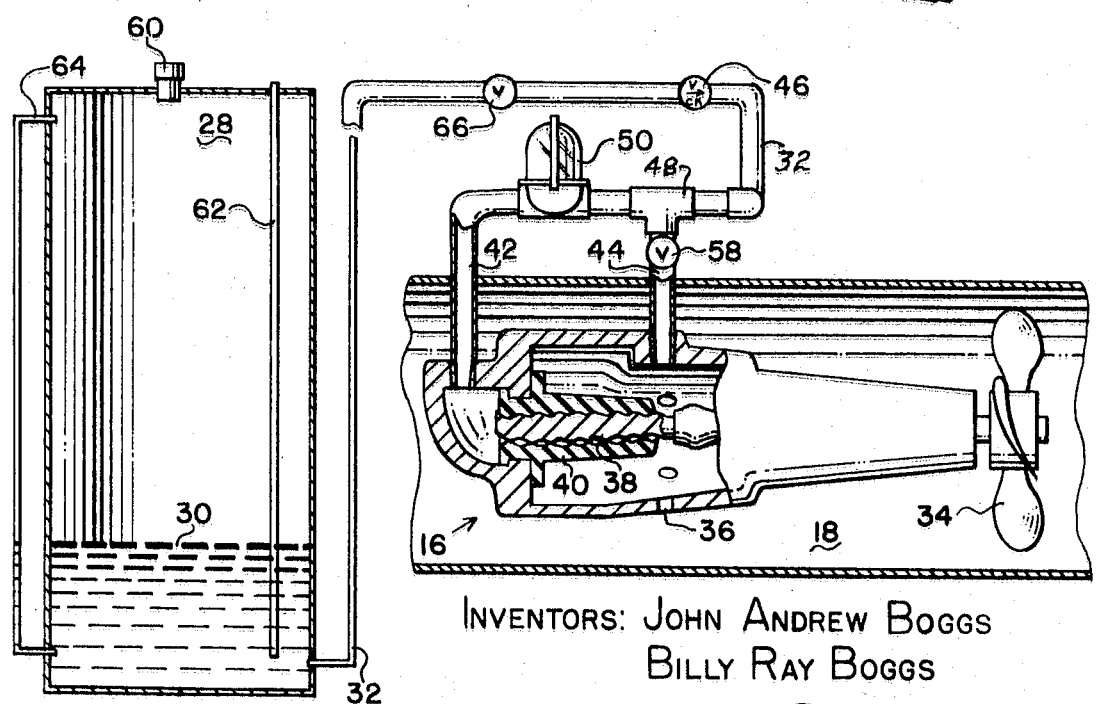
FIG. 3 is a sectional view of the fertilizer pump with associated equipment shown schematically.

The supply conduit 32 is connected through check valve 46 to tee 48. The check valve permits flow only from the supply tank 38 to the pump 16. One opening from tee 48 is connected to orifice bowl 50. It has been found that a fuel sediment bowl from an automobile is well adapted to use as the orifice bowl 50. It is inverted and the center opening of the bowl is connected to the tee 48. Orifice plate 52 having a small opening is held in the inlet tube 54 of the orifice bowl 50 by rubber gasket 56 by friction. (FIG. 4) The outlet from the orifice bowl is attached to the inlet nipple 42. The outlet nipple 44 is attached through manual valve 58 to the other connection of the tee 58. In normal operation, the valve 58 is closed.

The supply tank 28 is sealed by cap 60 over the filling opening thereof. However, vent tube 62 within the supply tank extends from above the top of the supply tank to adjacent the bottom of the supply tank. The supply tank is also equipped with visual gauge 64 for determining the level of the contents therein. Valve 66 is in the supply conduit 32 between the tank 28 and check valve 46.

In operation, the valve 66 would be open and the valve 58 closed. Therefore, as water flows through the water pipe 12, it rotates the propeller 34, energizing the pump 16. The pump draws fertilizer 30 through the supply conduit 32 and discharges it through outlets 36 into the section 18 where it is thoroughly mixed with the irrigation water by propeller 34. With the particular relationship of the vent pipe 62, the pressure of the fertilizer within the supply tank 28 as it is being withdrawn will always be the same regardless of the amount of fertilizer in the tank, provided the tank is less than about 25 feet tall, which it is. As the fertilizer is withdrawn, a partial vacuum will form in the top of the tank 28, which is relieved only by air coming through the vent pipe 62 so that the pressure at that level will be atmospheric at all times that there is fertilizer at the bottom of the vent pipe 62. Therefore, the fertilizer is supplied at constant pressure to the orifice plate 52.

The capacity of the pump 16 running at all operating speeds is much greater than the capacity of the hole through the orifice plate 52. Therefore, there will always be about the same amount of vacuum upon the orifice bowl 50 which is transparent. Since the fertilizer is supplied to the orifice bowl at a constant pressure and is being pulled with the same amount of vacuum, the flow of fertilizer into the water will be at a constant time rate of flow. In a given length of time (e.g., 12 hours), the same amount of fertilizer will be applied to any given field the farmer is irrigating. Furthermore, if the water flow ceases through section 18 through failure of the motor on the pump 10 or other reasons, the pump will cease rotating and there will be no flow of fertilizer wasting the fertilizer. The vacuum on the orifice bowl 50 will be sufficient to evacuate the bowl except for the fertilizer squirting up like a fountain from the hole in the orifice plate 52.

If it is desired to stop the flow of fertilizer while the pump 16 is operating, this may be done by opening the manual valve 58. As the valve 58 is connected to the outlet of the pump 16, it will be at a greater pressure than the fertilizer at the tee 48. (It will be noted that the bottom of the vent pipe 62 is about at the same level or below the pump 16 so that normally the fertilizer will be supplied to the tee 48 at about atmospheric pressure or slightly below). Since the water is being supplied to tee 48 at a greater pressure than fertilizer, the check valve 46 will close and water will be circulated through the pump 16. This is desirable inasmuch as the pump 16 has a longer life if liquids are being pumped through it than if it is running dry. Inasmuch as most fertilizers have a characteristic color, the operator can readily determine by looking at bowl 50 whether there is any fertilizer flowing. Also, the valve 66 may be closed if the fertilizer is to be closed for an extended period of time.

We claim:

1. A system for injecting fluid agricultural chemicals in an agricultural irrigation system comprising:
   a. a water pipe through which the irrigation water flows;
   b. a supply tank of fluid agricultural chemicals,
   c. a supply conduit from the supply tank to the water pipe;
   d. restriction means in the supply conduit for regulating the time rate of fluid agricultural chemicals flow through the conduit; and
   e. pump means operatively associated with the water pipe for pumping the fluid agricultural chemicals, said pump means having a capacity for pumping at a time rate faster than the restriction means for regulating;
   f. the supply conduit connected to the intake of the pump means;
   g. the outlet of the pump means having a discharge opening into the water pipe; and
   h. the pump means responsive to the flow of water through the water pipe.

2. The invention as defined in claim 1 wherein:
   a. said pump means is connected in a section of said water pipe; each end of which is
   b. telescoped over adjacent portions of the water pipe with;
   c. gaskets between the section and adjacent portions; and
   d. clamps to compress the gaskets to structurally support the section and form a fluid seal.

3. The invention as defined in claim 1 wherein said restriction means is in the form of an orifice which discharged onto a transparent bulb, like a fountain.

4. The invention as defined in claim 1 with the addition of:
   a. a manual valve;
   b. the outlet of the pump means is also connected to the manual valve outside the pipe;
   c. a check valve in the supply pipe between the supply tank and the restriction means which permits fluid flow from the tank to the pump means only; and
   d. the manual valve outlet connected to the supply pipe between the restriction means and check valve.

5. The invention as defined in claim 4 wherein said restriction means is in the form of an orifice which discharges onto a transparent bulb, like a fountain.

6. The invention as defined in claim 1 with the addition of stirring means in the water pipe downstream from the outlet of the pump means for mixing the fluid fertilizer and water.

7. The invention as defined in claim 6 wherein the stirring means is a propeller which drives the pump means.

8. In an agricultural irrigation system having:
   a. a supply of water;
   b. adapted to be applied onto land to be irrigated; and
   c. a water pipe connected to the supply of water;
   d. the improvement for injecting fluid fertilizer into the water comprising in combination with the above;
   e. a section of pipe;
   f. connections on each end of the section of pipe connecting the section of pipe into the water pipe,
   g. each of said connections including;
      i. the end of the section telescoped over the water pipe;
      ii. a gasket between the section and water pipe
      iii. clamps to compress the gasket to structurally support the section and form a fluid seal,
   h. a pump in the section of pipe;
   j. a propeller on the pump for driving the pump from the water flow in the pipe;
   k. said propeller downstream from the pump;
   m. a tank containing fluid fertilizer;
   n. a supply conduit from the tank to the pump; and
   o. at least one discharge opening from the pump into the section of pipe.

9. In an agricultural irrigation system having:
   a. a supply of water;
   b. adapted to be applied onto land to be irrigated; and
   c. a water pipe connected to the supply of water;
   d. the improvement for injecting fluid fertilizer into the water comprising in combination with the above:
   e. a section of pipe;
   f. connections on each end of the section of pipe connecting the section of pipe into the water pipe;
   g. a pump in the section of pipe;
   h. propeller on the pump for driving the pump from the water flow in the pipe;
   j. said propeller downstream from the pump;
   k. a tank containing fluid fertilizer
   m. a supply conduit from the tank to the pump;
   n. a check valve in the supply conduit preventing flow from the pump to the tank;
   o. an orifice in the supply conduit between the check valve and pump;
   p. a transparent bulb in the conduit immediately downstream of the orifice;
   q. at least one discharge opening from the pump into the section of pipe;
   r. a manual valve outside the section of pipe;
   s. another discharge opening of the pump connected to the manual valve;
   t. the manual valve discharge connected to the supply conduit between the check valve and orifice;
   u. said tank of fertilizer sealed except for a vent pipe extending from the atmosphere above the tank to adjacent the bottom of the tank; and
   v. said orifice restricting the flow of fluid fertilizer to less than the pump volume.

10. The method of adding fluid fertilizer to irrigation water comprising:
    a. supplying fluid fertilizer at a constant pressure to an orifice;
    b. pumping the fertilizer from the orifice into the water stream;
    c. energizing the pump from the water flow so that the pump operates only when the water flows;
    d. closing the flow path of the fertilizer to the water stream when the pump is not energized;
    e. sizing the orifice to the desired time rate of flow of fertilizer; and
    f. pumping the fertilizer from the orifice at a high rate so that the flow of fluid fertilizer is regulated by the orifice size and is independent of operating pump speeds.

11. The method of adding fluid fertilizer to irrigation water comprising:
    a. supplying fluid fertilizer at a constant pressure to an orifice;
    b. supplying the fertilizer to the orifice only when there is a flow of irrigation water;
    c. flowing the fertilizer from the orifice into the stream of irrigation water;
    d. closing the flow path of the fertilizer to the stream of the irrigation water when fertilizer is not being supplied;
    e. sizing the orifice to the desired time rate of flow of fertilizer; and
    f. regulating the pressures on the orifice so that the flow of fluid fertilizer is regulated by the orifice size and is independent of other factors.

12. In an agricultural irrigation system having:
    a. a water pump;
    b. a water pipe connected to the discharge of said water pump;
    c. a source of supply of liquid fertilizer; and
    d. a waterflow in said water pipe when said water pump is operating:
    e. the improved method for injecting fertilizer into the water flow comprising;
    f. pumping the fertilizer from the source of supply to the water pipe,
    g. pumping said fertilizer responsive to operation of said water pump;

h. closing the flow path of the fertilizer from the source of supply to the water pipe when the pump is not energized;

j. pumping the fertilizer at a predetermined time rate of flow.

13. The method of injecting liquid fertilizer into irrigation water comprising:
    a. supplying fertilizer under ambient pressure to an orifice;
    b. pumping the fertilizer from the orifice by a pump having sufficient capacity; thus
    c. reducing the pressure from the pump side of the orifice to substantially below atmospheric pressure; and
    d. delivering the fertilizer after having passed through the orifice and the pump into the stream of irrigation water; and
    e. operating said pump only when irrigation water is flowing.

14. The invention as defined in claim 13 with the additional limitation of visually monitoring the flow of the fertilizer through the orifice.